(12) United States Patent
Saga

(10) Patent No.: US 6,850,870 B2
(45) Date of Patent: Feb. 1, 2005

(54) FAILURE DIAGNOSIS DEVICE FOR $O_2$ SENSOR

(75) Inventor: Tadayuki Saga, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 78 days.

(21) Appl. No.: 10/202,083

(22) Filed: Jul. 25, 2002

(65) Prior Publication Data

US 2003/0154053 A1 Aug. 14, 2003

(30) Foreign Application Priority Data

Feb. 12, 2002 (JP) ........................................ 2002-033979

(51) Int. Cl.[7] .............................................. F02D 41/22
(52) U.S. Cl. ...................... 702/185; 702/183; 123/685; 123/688
(58) Field of Search ............................ 702/185, 22–24, 702/30–32, 57–59, 64, 65, 104, 110, 113, 114, 130, 136, 176–178, 183, 184, 188; 123/681, 685, 687, 690, 697, 688, 672, 674, 677, 703, 704; 73/118.1, 23.31, 23.32, 1.02, 1.06; 701/101, 105, 109, 108, 104; 60/277, 272, 274, 276; 205/785; 204/401, 406, 407, 408, 424, 196.02, 196.03, 196.05, 196.06

(56) References Cited

U.S. PATENT DOCUMENTS 5,423,203 A * 6/1995 Namiki et al. ................ 73/1.06
5,709,198 A * 1/1998 Sagisaka et al. ............. 123/684
5,928,303 A * 7/1999 Sakai .......................... 701/109
6,136,169 A * 10/2000 Okamoto ..................... 204/401
6,453,720 B1 * 9/2002 Tomisawa .................... 73/1.06

FOREIGN PATENT DOCUMENTS

JP          3227912        9/2001

* cited by examiner

Primary Examiner—Hal Wachsman
(74) Attorney, Agent, or Firm—Sughrue Mion, PLLC

(57) ABSTRACT

A failure diagnosis device for an $O_2$ sensor includes an $O_2$ sensor; a heater driving unit driving a heater heating the $O_2$ sensor; and a diagnosis unit controlling the heater driving unit heating the heater, and diagnosing $O_2$ sensor failure after a given amount of time based on an $O_2$ sensor activation status determination using $O_2$ sensor outputs. The diagnosis unit includes a heater controlling unit controlling the heater driving unit; a time measuring unit measuring time that electric current is supplied to the heater, and time used in determining sensor abnormality; an activation status determining unit determining air/fuel ratio changes from a lean to rich state, or from a rich to lean state based on the $O_2$ sensor output; and a failure determining unit determining sensor abnormality based on outputs from the time measuring unit and the activation status determining unit, thereby diagnosing $O_2$ sensor failure without engine operation.

11 Claims, 6 Drawing Sheets

US 6,850,870 B2

FAILURE DIAGNOSIS DEVICE FOR $O_2$ SENSOR

This application is based on application Ser. No. 2002-33979, filed in Japan on Feb. 12, 2002, the contents of which are hereby incorporated by reference.

BACKGROUND OF THE INVENTION

1. Field of the Invention

The present invention relates to a failure diagnosis device for an $O_2$ sensor used in a fuel injection control system of an internal combustion engine.

2. Description of the Related Art

In a fuel injection control system of an internal combustion engine, an $O_2$ sensor is used as air/fuel ratio detection means for detecting an air/fuel ratio in exhaust gas from an internal combustion engine. In order to determine whether the $O_2$ sensor is operating normally, a determination is made by taking advantage of the fact that output voltage from the $O_2$ sensor changes near the theoretical air/fuel ratio. Specifically, by making the engine operate under combustion conditions that would cause the exhaust gas to enter a rich state, it becomes possible to judge that the sensor is operating normally when the output from the $O_2$ sensor changes from a lean state to the rich state.

However, in the $O_2$ sensor failure diagnosis according to the conventional example described above, it is also necessary to have the engine actually running, and it is necessary that the engine run at an air/fuel ratio richer than the theoretical air/fuel ratio. Accordingly, exhaust gas is generated during the internal combustion engine manufacturing process, thus having a negative effect on the environment.

SUMMARY OF THE INVENTION

The present invention has been made in light of the above-mentioned points, and as object thereof is to provide a failure diagnosis device for an $O_2$ sensor which is capable of performing the $O_2$ sensor failure diagnosis without operating the engine.

With the above object in view, the failure diagnosis device for an $O_2$ sensor according to the present invention comprises an $O_2$ sensor for detecting an air/fuel ratio in exhaust gas from an internal combustion engine, a heater driving unit for driving a heater for heating the $O_2$ sensor, and a diagnosis unit for controlling the heater driving unit for heating the heater, and, after heating the heater for a given amount of time, performing a failure diagnosis regarding the $O_2$ sensor, based on a determination of an $O_2$ sensor activation status which is made on the basis of an output from the $O_2$ sensor.

Therefore, since the determination of the activation status of the $O_2$ sensor can be performed without operating the engine, the exhaust gas can be reduced in the manufacturing process of the internal combustion engine provided with the $O_2$ sensor, thereby obtaining an effect of suppressing the emission of environmentally hazardous substances.

DETAILED DESCRIPTION OF THE PREFERRED EMBODIMENTS

Figure 1:
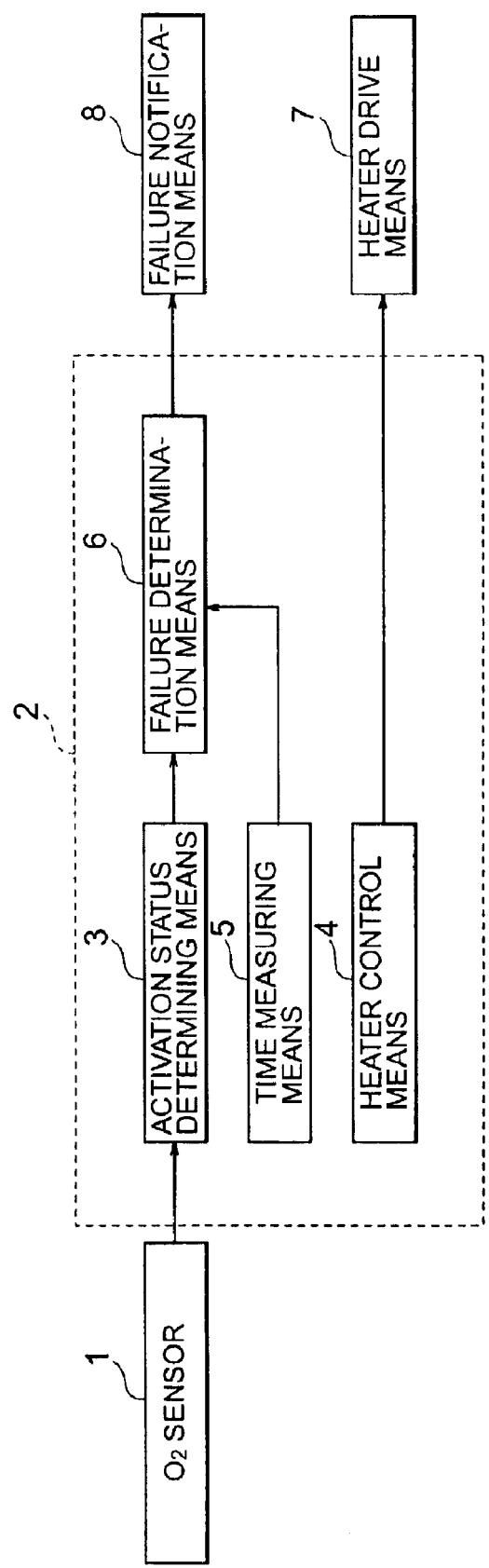
FIG. 1 is a block diagram showing a construction of a failure diagnosis device for an $O_2$ sensor in accordance with an embodiment of the present invention.

FIG. 1 is a block diagram showing a construction of a failure diagnosis device for an $O_2$ sensor in accordance with an embodiment of the present invention. In FIG. 1, reference numeral 1 indicates an $O_2$ sensor. Reference numeral 2 indicates a diagnosis means which heats a heater by controlling heater drive means discussed below for driving the heater to heat the $O_2$ sensor 1, and, then, after heating the heater for a given duration of time, performs a failure diagnosis on the $O_2$ sensor based on a determination of whether the $O_2$ sensor is active, as determined based on an output from the $O_2$ sensor 1. The diagnosis means 2 includes an activation status determining means 3 for determining the activation status of the $O_2$ sensor 1; a heater control means 4 for controlling the heater drive means that is described below; a time measuring means 5 for measuring time that an electric current is supplied to the heater control means 4, and for measuring time that is used in performing the determination of sensor abnormality; and a failure determination means 6 for determining sensor abnormality based on outputs from the time measuring means 5 and from the activation status determining means 3.

Further, reference numeral 7 indicates a heater drive means for driving the heater for heating the $O_2$ sensor 1, and reference numeral 8 indicates a failure notification means for notifying about the failure when the diagnosis means 2 determines that a sensor abnormality has occurred. Here, the activation status determining means 3 is configured to determine when the air/fuel ratio has changed from a lean state to a rich state or from the rich state to the lean state, based on an output signal form the $O_2$ sensor 1. The heater control means 4 controls an electric signal to the heater drive means 7, which is provided to heat the $O_2$ sensor 1 to a temperature which is needed for activation of the $O_2$ sensor 1.

Further, when the failure determination means 6 determines that the failure has occurred, the failure notification means 8 makes a failure notification. The failure notification means 8 may be a lamp or buzzer or the like for making the notification directly, and may also include sending a failure signal to another display apparatus or failure diagnosis device by using communications.

Figure 2:
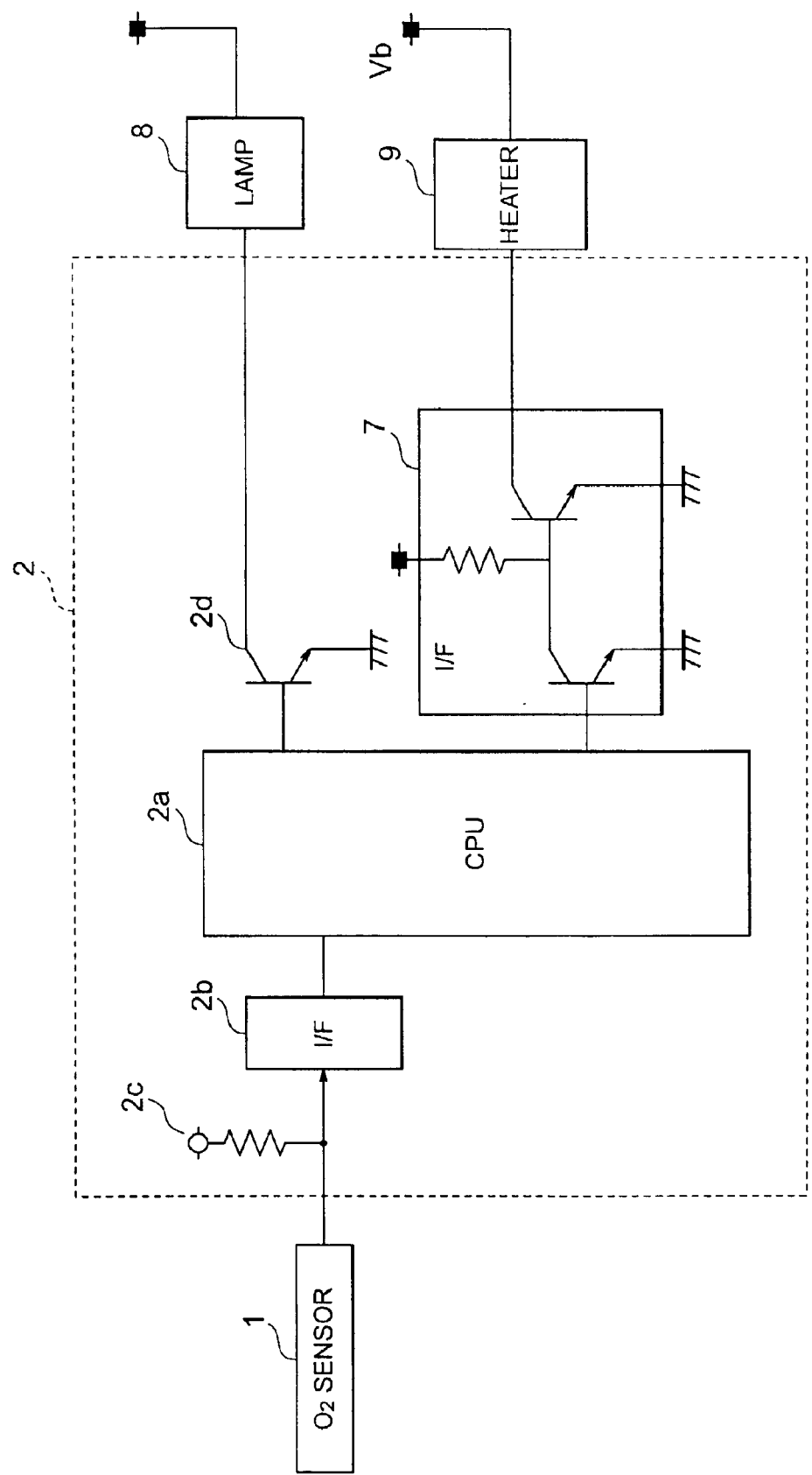
FIG. 2 is a diagram showing an outline of circuitry structure of a diagnosis means in accordance with the embodiment of the present embodiment.

FIG. 2 is a diagram showing an outline of a circuitry structure of the diagnosis means 2 according to the present embodiment. As shown in FIG. 2, the diagnosis means 2 includes a CPU 2a. An input stage of the CPU 2a is provided with an I/F circuit 2b, and between the I/F circuit 2b and the $O_2$ sensor 1 there is provided a pull-up resistor 2c for performing a pull-up at the same power source voltage as the CPU 2a. A divided voltage value obtained through the pull-up resistor 2c and an internal impedance exhibiting a negative coefficient of the $O_2$ sensor 1, is inputted into the CPU 2*a* via the I/F circuit 2*b* as an output value from the O$_2$ sensor 1. For the failure diagnosis and to drive a heater 9 for the O$_2$ sensor 1, the CPU 2*a* outputs a heater control signal to the heater drive means 7, thereby heating the O$_2$ sensor 1. Further, in a case where the CPU 2*a* judges that a failure has occurred, the CPU 2*a* outputs, to a transistor 2*d* and thus to a failure notification means 8, an output signal indicating occurrence of a failure. In accordance with the present invention, the failure notification means 8 is a lamp. Further, the heater drive means 7 is constituted by two transistors and a resistor.

Figure 3:
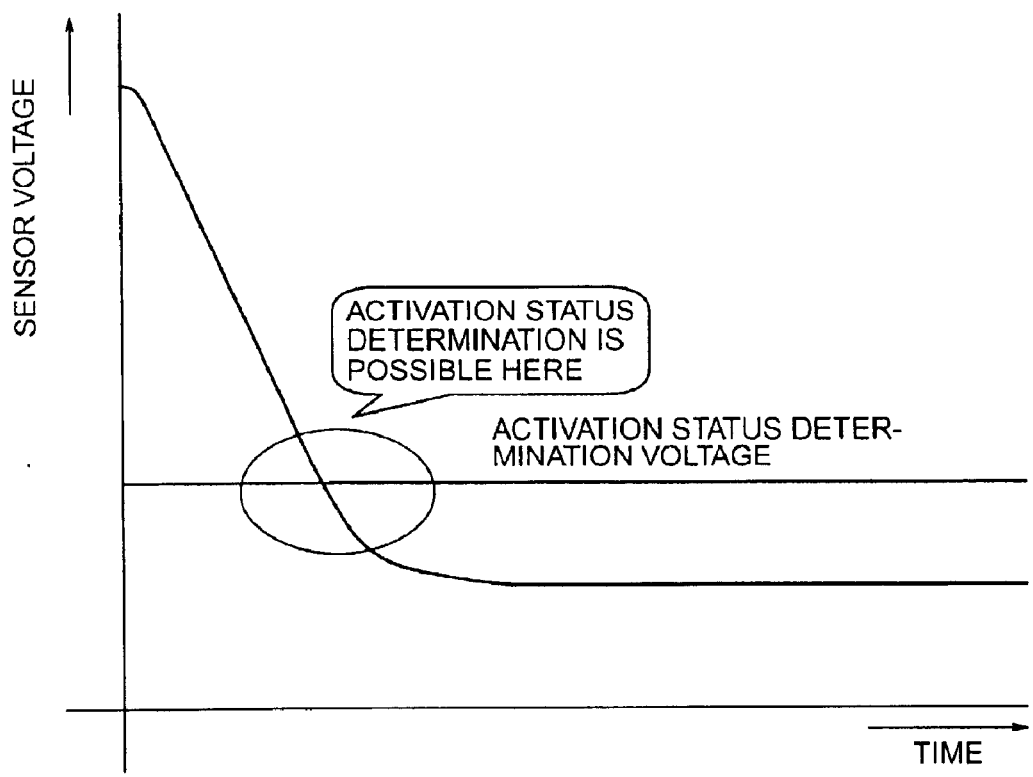
FIG. 3 is a time chart showing output voltage from the $O_2$ sensor according to the embodiment of the present invention.

FIG. 3 is a time chart of the voltage outputted from the O$_2$ sensor 1 in accordance with the present embodiment. Generally, the voltage outputted from the O$_2$ sensor 1 is about 0.2 V when the air/fuel ratio is on the lean side, and about 1 V of electromotive force is generated when on the rich side. The internal impedance of the O$_2$ sensor 1 exhibits a negative coefficient with respect to the temperature. At the time when the power source is turned on, the impedance is great. Therefore, the voltage divided through the pull-up resistor 2*c* substantially corresponds to the pull-up voltage. Then, as the O$_2$ sensor 1 is heated and activated by means of the heater 9, the internal impedance of the O$_2$ sensor 1 drops. As a result, the electromotive force generated by the O$_2$ sensor 1 itself is outputted to a terminal.

Figure 6:
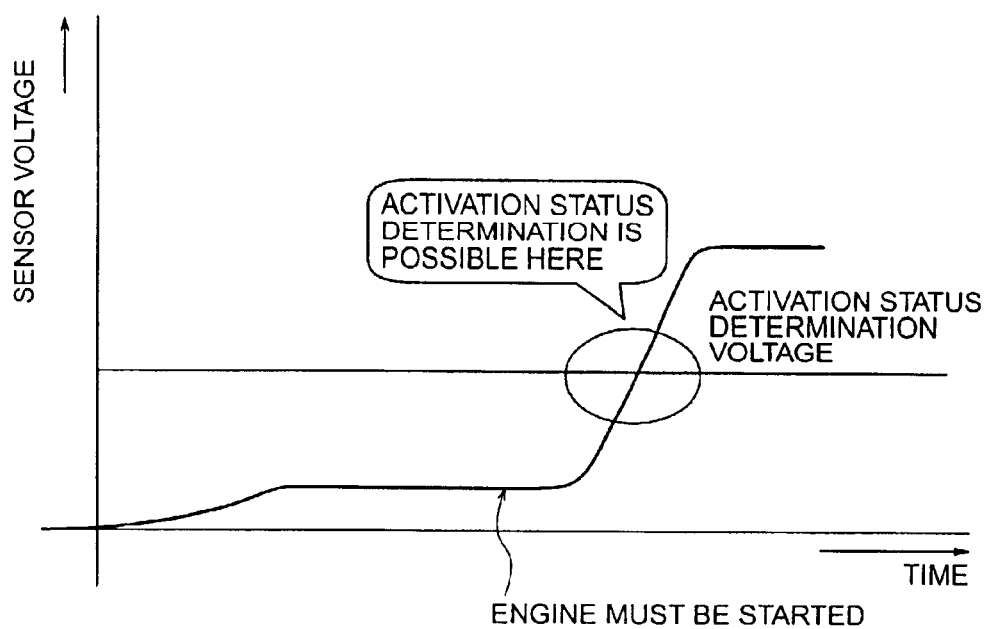
FIG. 6 is a time chart showing output voltage from an $O_2$ sensor when a determination of an activation status is performed, in accordance with the conventional example.

FIG. 6 is a time chart showing voltage outputted from an O$_2$ sensor when a determination of an activation status is made in accordance with a conventional example. In this example, the power source is turned on, and, then, after enough time has elapsed for the O$_2$ sensor to be sufficiently heated by the heater to thus operate normally, it is then necessary to start the engine and run the engine in such a way that the air/fuel ratio enters the rich side. In the case where the sensor operation is normal, the voltage outputted from the sensor indicates that the air/fuel ratio is on the rich side, and, therefore, it is determined that the sensor operation is normal.

Figure 4:
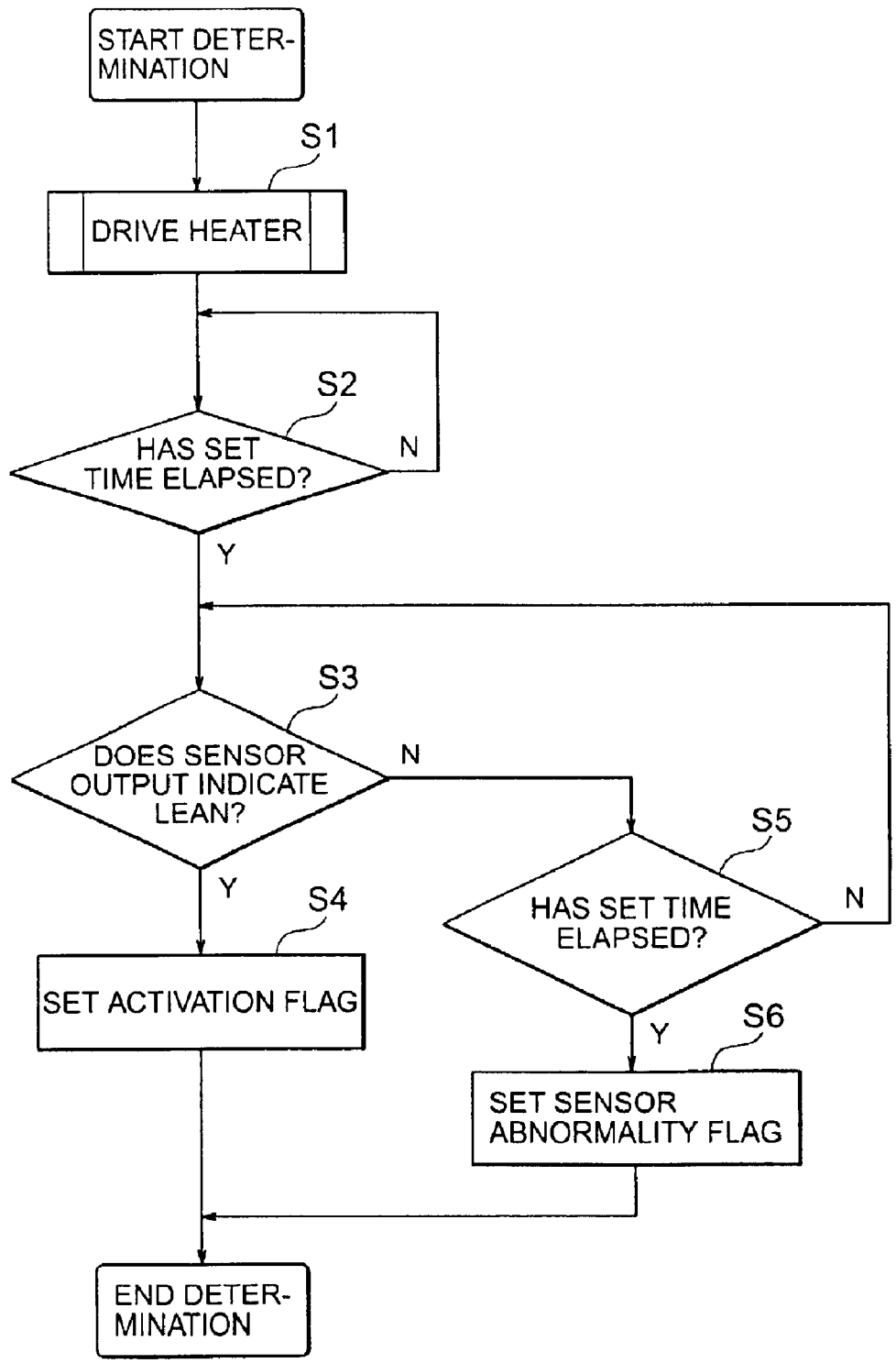
FIG. 4 is a flow chart showing content of controls performed by a CPU which constitutes a main part of the diagnosis means in accordance with the embodiment of the present embodiment.

FIG. 4 is a flow chart showing content of controls performed by the CPU 2*a*, which constitutes a main part of the diagnosis means 2, in accordance with the present embodiment. At step S1, the CPU 2*a* drives the heater 9 which heats the O$_2$ sensor 1. At step S2, the CPU 2*a* waits for a duration of time necessary to heat the O$_2$ sensor 1. At step S3, the CPU 2*a* judges whether the sensor output indicates the lean state. Then, in the case where the lean state is detected, the control advances to step S4. In the case where the rich state is detected, the control advances to step S5.

At step S4, a flag is set to indicate that the O$_2$ sensor 1 is activated, and at step S5 a determination of a time duration is performed. If the set duration of time has not elapsed, the control returns to step S3. If the set duration of time has elapsed the control advances to step S6, and a flag indicating abnormality is set.

Figure 5:
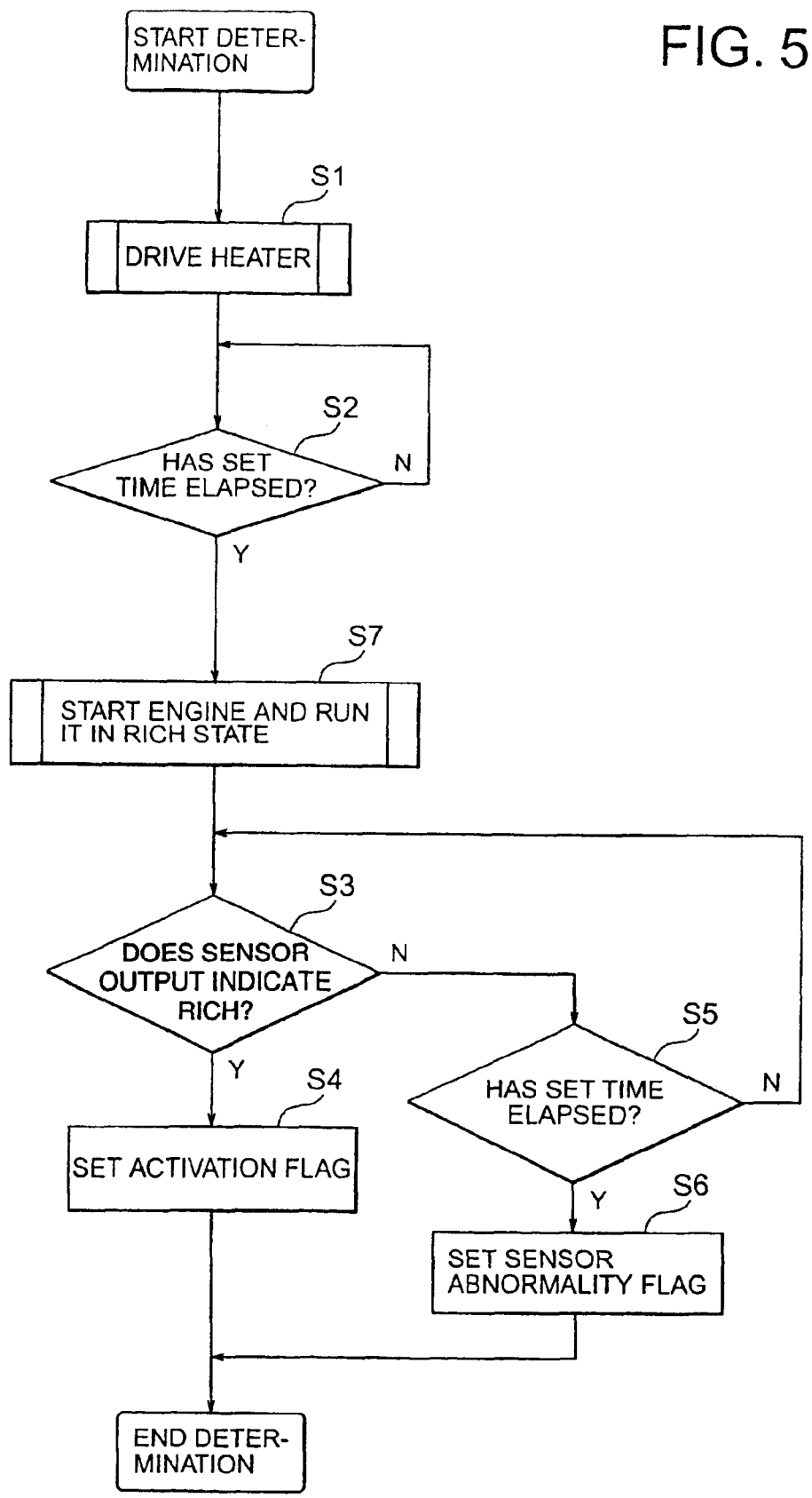
FIG. 5 is a flow chart according to a conventional example shown in comparison to FIG. 4.

The flow chart according to the embodiment shown in FIG. 4 is different from the flow chart according to the conventional example shown in FIG. 5 in that step S7 of driving the engine to make the determination of the activation status is eliminated.

Therefore, since the above-mentioned embodiment enables determination of an O$_2$ sensor activation status without running the engine, it becomes possible to reduce exhaust gas in the manufacturing process of an internal combustion engine provided with the O$_2$ sensor. Thus, emission of environmentally hazardous substances can be suppressed.

Further, the change in the O$_2$ sensor's internal impedance when the O$_2$ sensor is activated by itself can be learned from the sensor signal obtained through the voltage division through the pull-up resistor that is added to the detection circuit in the control device. As a result, it becomes possible to determine whether the O$_2$ sensor is operating normally without having to operate the engine.

As described above, in accordance with the present invention, since the determination of the activation status of the O$_2$ sensor can be performed without operating the engine, the exhaust gas can be reduced in the manufacturing process of the internal combustion engine provided with the O$_2$ sensor, thereby obtaining an effect of suppressing the emission of environmentally hazardous substances.

What is claimed is:

1. A failure diagnosis device for an O$_2$ sensor, comprising:
   an O$_2$ sensor for detecting an air/fuel ratio in exhaust gas of an internal combustion engine;
   a heater drive means for driving a heater for heating the O$_2$ sensor; and
   a diagnosis means for controlling the heater drive means for heating the heater, and, after heating the heater for a given amount of time, performing a failure diagnosis regarding the O$_2$ sensor when the engine is not running, based on a determination of an O$_2$ sensor activation status which is made based on an output from the O$_2$ sensor.

2. The failure diagnosis device for an O$_2$ sensor according to claim 1, wherein the diagnosis means performs the determination of an activation status by determining that the sensor is active when the air/fuel ratio is determined to be in a lean state based on the output from the O$_2$ sensor, and by determining that the sensor operation is abnormal in a case where the air/fuel ratio is determined to continue in a rich state for a given duration of time.

3. The failure diagnosis device for an O$_2$ sensor according to claim 1, wherein the diagnosis means comprises:
   a heater control means for controlling the heater drive means;
   a time measuring means for measuring a time duration that an electric current is supplied to the heater control means, and for measuring time that is used in performing a determination of the sensor abnormality;
   an activation status determining means for determining a change in the air/fuel ratio from the lean state to the rich state, or from the rich state to the lean state, based on the output from the O$_2$ sensor; and
   a failure determining means for determining the sensor abnormality based on outputs from the time measuring means and from the activation status determining means.

4. The failure diagnosis device for an O$_2$ sensor according to claim 1, further comprising a failure notification means for making a notification of failure in the case where the diagnosis means determines that the sensor operation is abnormal.

5. The failure diagnosis device for an O$_2$ sensor according to claim 1, wherein:
   the diagnosis means is composed of a CPU;
   an input stage of the CPU is provided with an interface (I/F) circuit, and between the I/F circuit and the O$_2$ sensor there is provided a pull-up resistor for performing a pull-up at the same power source voltage as the CPU; and
   a divided voltage value which is obtained through the pull-up resistor and an internal impedance exhibiting a negative coefficient with regard to the temperature of the $O_2$ sensor, is inputted into the CPU via the I/F circuit as the output from the $O_2$ sensor.

6. A failure diagnosis device for an $O_2$ sensor, comprising:

an $O_2$ sensor for detecting an air/fuel ratio in exhaust gas of an internal combustion engine;

a heater drive means for driving a heater for heating the $O_2$ sensor; and a diagnosis means for controlling the heater drive means for heating the heater, and, after heating the heater for a given amount of time, performing a failure diagnosis regarding the $O_2$ sensor, based on a determination of an $O_2$ sensor activation status which is made based on an output from the $O_2$ sensor, wherein the diagnosis means performs the determination of an activation status by determining that the sensor is active when the air/fuel ratio is determined to be in a lean state based on the output from the $O_2$ sensor, and by determining that the sensor operation is abnormal in a case where the air/fuel ratio is determined to continue in a rich state for a given duration of time.

7. A failure diagnosis device for an $O_2$ sensor, comprising:

an $O_2$ sensor for detecting an air/fuel ratio in exhaust gas of an internal combustion engine;

a heater drive means for driving a heater for heating the $O_2$ sensor; and a diagnosis means for controlling the heater drive means for heating the heater, and, after heating the heater for a given amount of time, performing a failure diagnosis regarding the $O_2$ sensor, based on a determination of an $O_2$ sensor activation status which is made based on an output from the $O_2$ sensor, wherein the diagnosis means comprises:

a heater control means for controlling the heater drive means;

a time measuring means for measuring a time duration that an electric current is supplied to the heater control means, and for measuring time that is used in performing a determination of the sensor abnormality;

an activation status determining means for determining a change in the air/fuel ratio from the lean state to the rich state, or from the rich state to the lean state, based on the output from the $O_2$ sensor; and a failure determining means for determining the sensor abnormality based on outputs from the time measuring means and from the activation status determining means.

8. A failure diagnosis device for an $O_2$ sensor, comprising:

an $O_2$ sensor for detecting an air/fuel ratio in exhaust gas of an internal combustion engine;

a heater drive means for driving a heater for heating the $O_2$ sensor; and a diagnosis means for controlling the heater drive means for heating the heater, and, after heating the heater for a given amount of time, performing a failure diagnosis regarding the $O_2$ sensor, based on a determination of an $O_2$ sensor activation status which is made based on an output from the $O_2$ sensor, wherein:

the diagnosis means is composed of a CPU;

an input stage of the CPU is provided with an interface (I/F) circuit, and between the I/F circuit and the $O_2$ sensor there is provided a pull-up resistor for performing a pull-up at the same power source voltage as the CPU; and a divided voltage value which is obtained through the pull-up resistor and an internal impedance exhibiting a negative coefficient with regard to the temperature of the $O_2$ sensor, is inputted into the CPU via the I/F circuit as the output from the $O_2$ sensor.

9. A failure diagnosis device for a sensor, comprising:

a sensor that detects an air/fuel ratio in exhaust gas of an internal combustion engine;

a heater that heats the sensor; and a control circuit that controls the heater, wherein, after heating the heater for a given amount of time, the control circuit performs a failure diagnosis regarding the sensor, based on a determination of a sensor activation status which is made based on an output from the sensor, wherein the control circuit determines, based on the output from the sensor, that the sensor is active when the air/fuel ratio is in a lean state and determines that the sensor is operating abnormally when the air/fuel ratio is in a rich state for a given duration of time.

10. A failure diagnosis device for a sensor, comprising:

an sensor that detects an air/fuel ratio in exhaust gas of an internal combustion engine;

a heater that heats the sensor; and controller that controls the heater, wherein, after heating the heater for a given amount of time, the control circuit performs a failure diagnosis regarding the sensor, based on a determination of a sensor activation status which is made based on an output from the sensor, wherein the control circuit measures a time duration that an electric current is supplied to control the heater and measures time that is used to determine whether or not the sensor is operating normally, wherein the control circuit determines a change in the air/fuel ratio from the lean state to the rich state, or from the rich state to the lean state, based on the output from the sensor; and wherein the control circuit determines that the sensor is operating abnormally based on the time duration that the electric current is supplied, the time that is used to determine whether or not the sensor is operating normally, and the change in the air/fuel ratio.

11. A failure diagnosis device for a sensor, comprising:

a sensor that detects an air/fuel ratio in exhaust gas of an internal combustion engine;

a heater that heats the sensor; and a control circuit that controls the heater, wherein, after heating the heater for a given amount of time, the control circuit performs a failure diagnosis regarding the sensor, based on a determination of a sensor activation status which is made based on an output from the sensor, wherein an input stage of the control circuit is provided with an interface (I/F) circuit, and a pull-up resistor is provided between the I/F circuit and the sensor, wherein the pull-up resistor performs a pull-up at the same power source voltage as the control circuit, and wherein a divided voltage value is obtained through the pull-up resistor and an internal impedance exhibiting a negative coefficient with regard to the temperature of the sensor, is inputted into the control circuit via the I/F circuit as the output from the $O_2$ sensor.

* * * * *